(12) United States Patent
Garcia Martinez et al.

(10) Patent No.: US 10,292,211 B2
(45) Date of Patent: May 14, 2019

(54) COOKING UTENSIL

(71) Applicant: BSH Hausgeräte GmbH, Munich (DE)

(72) Inventors: Jose Andres Garcia Martinez, Zaragoza (ES); Sergio Llorente Gil, Zaragoza (ES); Teresa Del Carmen Marzo Alvarez, Zaragoza (ES); Jorge Mir Bel, Zaragoza (ES); Julio Rivera Peman, Cuarte de Huerva (ES); Francisco Javier Sancho Diaz, Zaragoza (ES); Beatriz Villanueva Valero, Zaragoza (ES)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 15/571,508

(22) PCT Filed: Apr. 26, 2016

(86) PCT No.: PCT/IB2016/052356
§ 371 (c)(1),
(2) Date: Nov. 3, 2017

(87) PCT Pub. No.: WO2016/185303
PCT Pub. Date: Nov. 24, 2016

(65) Prior Publication Data
US 2018/0146517 A1 May 24, 2018

(30) Foreign Application Priority Data
May 21, 2015 (ES) .................................. 201530704

(51) Int. Cl.
*H05B 6/12* (2006.01)
*H05B 6/06* (2006.01)

(52) U.S. Cl.
CPC .......... *H05B 6/1236* (2013.01); *H05B 6/062* (2013.01); *H05B 6/1209* (2013.01); (Continued)

(58) Field of Classification Search
CPC ............................................ H05B 6/12–6/129
See application file for complete search history.

(56) References Cited

U.S. PATENT DOCUMENTS 3,421,528 A * 1/1969 Gomez ................ A61C 17/036
134/188
4,038,518 A 7/1977 Morton et al.
(Continued)

FOREIGN PATENT DOCUMENTS

| EP | 2548636 A1 | 1/2013 |
|---|---|---|
| EP | 2757660 A1 | 7/2014 |
| WO | 2014056785 A1 | 4/2014 |

OTHER PUBLICATIONS

International Search Report PCT/IB2016/052356 dated Jul. 20, 2016.
National Search Report ES P201530704 dated Mar. 31, 2016.

*Primary Examiner* — Michael A Laflame, Jr.
(74) *Attorney, Agent, or Firm* — Michael E. Tschupp; Andre Pallapies; Brandon G. Braun

(57) ABSTRACT

A cooking utensil for positioning on a cooktop plate to perform a heating operation includes a functional unit and a receiving unit which is configured to receive energy in a contactless manner and to supply energy to the functional unit. The functional unit includes at least one control unit which manages energy supplied by the receiving unit to supply energy to the functional unit in at least one operating state.

26 Claims, 3 Drawing Sheets

(52) U.S. Cl.
CPC ...... *H05B 2213/03* (2013.01); *H05B 2213/06* (2013.01); *Y02B 40/123* (2013.01)

(56) References Cited

U.S. PATENT DOCUMENTS

| | | | | |
|---|---|---|---|---|
| 4,354,082 | A * | 10/1982 | Tellert | H05B 6/12 219/621 |
| 5,512,733 | A * | 4/1996 | Takikawa | H05B 6/062 219/620 |
| 6,281,611 | B1 * | 8/2001 | Chen | A47J 36/26 219/201 |
| 9,510,398 | B1 * | 11/2016 | Miller | H05B 6/1209 |
| 2002/0027175 | A1 * | 3/2002 | Capp | A47J 43/046 241/199.12 |
| 2006/0221765 | A1 | 10/2006 | Andersson | |
| 2009/0065500 | A1 * | 3/2009 | England | A47J 27/002 219/621 |
| 2010/0214867 | A1 * | 8/2010 | Karkos, Jr. | A47J 43/085 366/272 |
| 2013/0264333 | A1 * | 10/2013 | Alipour | H05B 6/12 219/621 |
| 2014/0203010 | A1 * | 7/2014 | Alet Vidal | B01F 13/0033 219/621 |
| 2014/0225448 | A1 * | 8/2014 | Kitaizumi | H05B 6/1236 307/104 |

* cited by examiner

COOKING UTENSIL

CROSS-REFERENCES TO RELATED APPLICATIONS

This application is the U.S. National Stage of International Application No. PCT/IB2016/052356, filed Apr. 26, 2016, which designated the United States and has been published as International Publication No. WO 2016/185303 A1 and which claims the priority of Spanish Patent Application, Serial No. P201530704, filed May 21, 2015, pursuant to 35 U.S.C. 119(a)-(d).

BACKGROUND OF THE INVENTION

The invention relates to a cooking utensil and a cooking system.

A cooking utensil, which is provided to be positioned on a cooktop plate of a cooktop apparatus to perform a heating operation, is already known from the prior art. During the heating operation the cooking utensil is heated by induction heating elements. The induction heating elements are arranged below a cooktop plate of the cooktop apparatus and are provided to heat the cooking utensil. A functional unit is attached to the cooking utensil, having an operating unit and being supplied with energy by accumulators.

BRIEF SUMMARY OF THE INVENTION

It is the object of the invention in particular to provide a generic cooking utensil with improved properties in respect of a high level of convenience.

A cooking utensil is proposed, which is provided for positioning on a cooktop plate to perform a heating operation, with a functional unit and with a receiving unit for receiving energy, in particular electromagnetic energy, in a contactless manner and for supplying energy to the functional unit. A "cooking utensil" refers in particular to a unit which is provided in particular to hold at least one food in at least one operating state and in particular to be in direct contact with the food in at least one operating state. The food could be for example a food to be cooked, in particular an item to be cooked and/or a food to be processed in particular mechanically, advantageously in a manner that goes beyond simple heating. A cooktop apparatus of a cooking system having the cooking utensil in particular has at least one induction heating element, which is provided in particular to provide and/or supply the cooking utensil at least with energy, in particular in the form of an electromagnetic alternating field, so that it can perform the heating operation. A "cooktop plate" refers in particular to a unit, which is provided for the positioning of cooking utensils thereon in at least one operating state and which is provided in particular to form a part of a cooktop exterior housing, in particular of a cooktop apparatus and/or a cooktop having a cooktop apparatus. The cooktop plate is made in particular at least largely of glass and/or ceramic glass. "At least largely" refers in particular to a percentage of at least 70%, in particular at least 80%, advantageously at least 90% and preferably at least 95%. A "functional unit" refers in particular to a unit which is provided to perform at least one function, which in particular goes beyond a function of holding food. In particular the functional unit is provided to be operated by means of an electric current. The receiving unit is provided in particular to receive electromagnetic energy, advantageously supplied by at least one induction unit, in at least one operating state. The receiving unit is preferably provided to supply the functional unit at least partially, in particular at least largely and advantageously completely by means of the received energy. The receiving unit could be provided for example to transfer energy inductively and/or to transfer energy capacitively and/or to transfer energy electromagnetically and/or to transfer energy by laser and/or to transfer energy by sound. "Provided" means in particular specifically programmed, designed and/or equipped. That an object is provided for a specific function means in particular that the object satisfies and/or performs said specific function in at least one application and/or operating state.

The inventive configuration in particular allows a high level of convenience to be achieved. In particular it allows a high level of flexibility in respect of a type of functional unit to be supplied and/or in respect of a type of energy transferred. The receiving unit can in particular supply a plurality of different functional units.

It is further proposed that the functional unit has at least one control unit. A "control unit" refers in particular to an electronic unit which has a computation unit and in particular a storage unit in addition to the computation unit, with an operating program stored therein, which is provided to be executed by the computation unit. The control unit is provided in particular to be supplied by means of electrical energy in at least one operating state and in particular to consume the electrical energy at least partially, in particular minus any losses resulting from the transportation of electric current. This in particular allows a particularly convenient configuration to be achieved.

It is also proposed that the control unit is provided to manage energy supplied by the receiving unit to supply energy to the functional unit in at least one operating state. The energy supplied by the receiving unit to supply energy to the functional unit corresponds in particular at least substantially, in particular minus any losses resulting from friction and/or the transportation of electric current, to the energy received by the receiving unit. The expression that the control unit is provided "to manage" energy supplied by the receiving unit to supply energy to the functional unit in at least one operating state means in particular that the control unit is provided to receive the energy received by the receiving unit and to transfer at least some of the energy to at least one further part of the functional unit and in particular to supply the further part with the energy in the operating state. The further part could be in particular at least one heating element and/or at least one output unit and/or at least one drive unit and/or at least one sensor. This allows a high level of energy efficiency in particular to be achieved.

The control unit is configured in particular separately from a cooktop control unit. The control unit could for example be provided to activate and/or operate at least one further part of the functional unit as a function of an operating input by means of an operating unit of the cooking utensil. Alternatively the control unit could have at least one filter and in particular could be provided to filter out at least high-frequency signals. A cooktop control unit could be provided in particular to activate and/or operate at least one further part of the functional unit as a function of an operating input by means of a cooktop operating unit. The control unit is preferably provided to communicate with at least one cooktop control unit in at least one operating state. The control unit is advantageously provided to manage the energy and/or to activate and/or operate at least one further part of the functional unit independently of control commands from a cooktop control unit. In particular the control unit could be provided to receive control commands from the cooktop control unit and/or to transfer at least one information item, in particular at least relating to the further part, to the cooktop control unit. The control unit could be provided for example to supply the energy to the further part as a function of at least one control command from the cooktop control unit. In particular the cooktop control unit and the control unit could communicate with one another by means of Bluetooth and/or by means of infrared and/or by means of a local radio network. A "cooktop control unit" refers in particular to an electronic unit, which is preferably integrated at least partially in a control and/or regulating unit of a cooktop and which is preferably provided to control and/or regulate at least one electronic supply unit, which is provided in particular to supply energy to at least one induction unit and/or at least one induction heating element. The cooktop control unit preferably comprises a computation unit and in particular a storage unit in addition to the computation unit, with a control and/or regulating program stored therein, which is provided to be executed by the computation unit. For example an operating input for at least one operating parameter of the functional unit can be effected by way of a cooktop operating unit of a cooktop apparatus, which is in particular part of a cooktop and/or cooktop system. This in particular allows a high level of operating convenience to be achieved. It also advantageously minimizes the complexity of the electronics unit.

It is further proposed that the receiving unit has at least one inductor. In particular the receiving unit has at least one coil, which is provided in particular to be magnetized and/or to generate at least one induction current as a function of at least one magnetic field, in particular an electromagnetic alternating field, supplied by at least one induction unit. The receiving unit could have in particular at least two, advantageously at least three, particularly advantageously at least five and preferably a number of inductors. This in particular allows an economical configuration. In particular a large quantity of power can be transferred.

It is also proposed that the functional unit has at least one heating element, which is provided to heat items to be cooked, which are arranged in particular in a food chamber. In particular the cooking utensil has at least one cooking utensil housing unit. The heating element is arranged within the cooking utensil housing unit, in particular within an intermediate space delimited by an exterior housing part of the cooking utensil housing unit and an interior housing part of the cooking utensil housing unit in at least one assembled state. The heating element is advantageously provided to heat the interior housing part of the cooking utensil housing unit in at least one operating state. The functional unit could in particular have at least two, advantageously at least three, particularly advantageously at least five and preferably a number of heating elements. A "heating element" in this context refers in particular to an element which is provided to convert energy, preferably electrical energy, to heat and supply it in particular to at least one cooking utensil. For example the heating element could be configured as a resistance heating element. The heating element is advantageously configured in particular as an induction heating element. An "induction heating element" in this context refers in particular to an element, which is provided to generate an electromagnetic alternating field in particular with a frequency between 20 kHz and 100 kHz, which is provided in particular to be converted to heat in an in particular metallic, preferably ferromagnetic, cooking utensil base positioned thereon by eddy current induction and/or magnetic reversal effects. This allows there to be in particular a small gap between the heating element and an interior housing part of the cooking utensil housing unit and/or a high level of energy efficiency.

The functional unit preferably has at least one food processing unit and at least one drive unit, which is provided to drive the food processing unit. A "food processing unit" refers in particular to a unit, which is provided to process at least one food, which is arranged in particular in the food chamber, in particular in a manner that goes beyond simple heating, in at least one operating state, and which has in particular at least one processing tool, which is provided to be in direct contact with the food in at least one operating state. The processing tool is provided in particular to process, in particular to mix and/or to whisk and/or to grind and/or to chop and/or to blend and/or to emulsify and/or to knead and/or to cut up at least one food arranged in the food chamber in at least one operating state. The processing tool is provided in particular to cause at least one food arranged in the food chamber to move in particular from at least one non-moving state and/or to keep it moving in particular from a moving state in at least one operating state. In at least one operating state of the food processing unit in particular at least a part of the food processing unit, in particular the processing tool, is provided to be in direct contact with the food. The food processing unit is provided in particular to process different types and/or consistencies of food, for example dough and/or liquid and/or at least partially fluid materials and/or sauces and/or at least partially solid foods. In particular the food processing unit has at least two, in particular at least three, advantageously at least five and preferably at least seven different processing tools. The drive unit is provided to supply at least drive energy in at least one operating state of the food processing unit, the drive unit generating, in particular acquiring and/or diverting and/or making available said drive energy from the energy supplied by the receiving unit to supply energy to the functional unit and in particular transferred by the control unit. This allows in particular a high level of convenience to be achieved. In particular it allows a high level of energy efficiency, in particular due to movement of an at least partially fluid food to be cooked. User-friendly and/or easy operation in particular can be achieved, it being possible to monitor and/or influence cooking parameters in particular in a simple manner. A high level of flexibility in particular can be achieved. In particular it minimizes the likelihood of burning and/or reduces soaking time, in particular improving the wear resistance and/or useful life of a cooking utensil, within which the food processing unit is arranged. By moving an at least partially fluid food to be cooked, it is possible in particular to achieve reproducible cooking results and/or a low level of inhomogeneity in a food to be cooked.

The functional unit could have at least one sensor for example. The sensor could be provided in particular to detect at least one movement component, in particular at least one torque and/or at least one acceleration moment and/or a rotational moment and/or a rotation speed, of the food processing unit. The sensor could be provided for example to transmit at least one sensor variable, which in particular characterizes the movement component of the food processing unit, to the control unit and/or the cooktop control unit. In particular the sensor could be provided to detect the movement component of the food processing unit optically and it could be configured for example as a photocell. Alternatively or additionally the sensor could be provided to detect the movement component of the food processing unit by means of a magnetic field. Alternatively or additionally the sensor could be provided to detect a temperature and/or a pH value and/or a weight and/or cooking state, for example boiling and/or simmering and/or slow simmering and/or boiling over, of a food arranged in the food chamber. The sensor could be for example an infrared sensor and/or a resistance sensor, for example an NTC resistor and/or a PTC resistor, and/or an acoustic sensor, for example a microphone, and/or a pressure sensor and/or a weight sensor for detecting a weight of food arranged in the food chamber and/or a volume sensor for detecting a volume of food arranged in the food chamber. In particular the control unit and/or the cooktop control unit could be provided to determine a change in a movement component of a food to be processed as a function of the sensor variable and in particular to perform at least one automatic processing operation and/or at least one automatic cooking operation.

Alternatively or additionally the functional unit could in particular have at least one output unit. The output unit could be provided in particular to output at least one output variable, which could be configured in particular as sound and/or light. The output unit could advantageously be configured as a display unit and could in particular have at least one LED. The output unit could be provided in particular to display the output variable. The cooktop control unit could be provided in particular to output at least one status associated with the cooking utensil by means of the output unit in at least one operating state. The cooktop control unit is provided to output different statuses by means of different intensity profiles of an output variable of the output unit in the operating state. In particular the cooktop control unit could be provided to output different statuses by means of different frequency spectra of an output variable of the output unit in the operating state. The cooktop apparatus in particular has at least one cooktop operating unit. In particular the cooktop control unit could be provided to display an assignment of the cooking utensil to an operating element of the cooktop operating unit by means of the output unit and the cooktop operating unit. In particular the cooktop control unit could be provided to display the assignment by using at least substantially the same color for a display by means of the output unit and by means of the cooktop operating unit in the operating state.

It is also proposed that the drive unit is provided to supply at least one magnetic field to drive the food processing unit. In particular the drive unit is provided to convert the energy supplied by the receiving unit and/or the energy transferred by the control unit at least largely to electromagnetic energy. For example the drive unit could be provided in particular to supply the electromagnetic energy directly to the food processing unit and in particular to drive the food processing unit by means of the electromagnetic energy, for example by means of a magnetic field. Alternatively the drive unit could be provided to convert the electromagnetic energy to a further energy form, for example mechanical energy, and in particular to supply the further energy form to the food processing unit and advantageously to drive the food processing unit by means of the further energy form. This allows the food processing unit to be driven particularly advantageously. In particular a high level of efficiency can be achieved.

It is also proposed that the drive unit has at least one electric motor, which is provided to drive the food processing unit. The drive unit has in particular at least one shaft. The shaft is then preferably provided to connect the electric motor and the food processing unit at least substantially to one another in at least one assembled state. The drive unit is preferably provided to drive the food processing unit by means of the electric motor by way of the shaft, said shaft engaging in particular through an interior housing part of a cooking utensil housing unit facing a food chamber. In an alternative exemplary embodiment the drive unit could in particular have at least one permanent magnet, which could be connected to the electric motor by the shaft in at least one operating state. The permanent magnet could be provided in particular to supply and/or generate the magnetic field supplied by the drive unit. In particular the drive unit could be provided to drive the food processing unit by means of the magnetic field supplied by the permanent magnet. In particular the permanent magnet could be provided to interact with at least one magnetic element of the food processing unit in at least one operating state and advantageously to supply said magnetic element with the magnetic field to drive it. In a further alternative exemplary embodiment the drive unit could have in particular at least two electromagnets, which could be provided in particular to supply the magnetic field to drive the food processing unit. An "electric motor" refers in particular to a structural unit, which is provided to convert electrical energy to kinetic energy. The drive unit is advantageously provided to convert the electromagnetic energy at least largely to kinetic energy and to transfer said kinetic energy advantageously to the food processing unit. The drive unit is provided in particular to cause the food processing unit to move and/or to keep it moving. In particular the movement is configured as a rotational movement rotating at least substantially about a rotation axis. This in particular allows standard components to be used, in particular keeping costs low. In particular a high level of reliability can be achieved.

It is also proposed that the drive unit is provided to supply a magnetic field that rotates at least substantially about at least one rotation axis and engages at least partially in a food chamber to drive the food processing unit. The food chamber is provided in particular to hold at least one food. A magnetic field "that rotates at least substantially about at least one rotation axis" refers in particular to a magnetic field, the polarity of which moves about the rotation axis in particular on average over time. For example the magnetic field could rotate at least substantially continuously about the rotation axis. The magnetic field could in particular rotate in a stepped manner, in particular in small, for example discrete, stages, about the rotation axis. A magnetic field "that engages at least partially in a food chamber" refers in particular to a magnetic field, the field lines of which engage at least partially in the food chamber and in particular can be measured therein, it being possible for a further part of the field lines to be arranged outside the food chamber. This allows the food processing unit to be driven particularly advantageously.

It is further proposed that the food processing unit has at least one magnetic element, which is provided to interact with the magnetic field. In particular the magnetic element is provided to absorb the magnetic field and to execute a rotational movement about the rotation axis in particular as a function of the magnetic field. For example the magnetic element could be a permanent magnet and/or an electromagnet and/or an inductor. The magnetic element could be configured for example as a single piece with the processing tool, which has in particular at least one magnet and could be provided to receive the magnetic field generated by the drive unit. Alternatively the magnetic element and processing tool could be configured as separate elements and be connected in particular mechanically to one another in particular in at least one assembled state. This avoids the need in particular for a recess in an interior housing part delimiting the food chamber and/or allows easy cleaning.

It is also proposed that the cooking utensil has at least one cooking utensil housing unit, which has at least one exterior housing part facing away from the food chamber and at least one interior housing part facing the food chamber and within which the functional unit and in particular also the receiving unit is/are at least partially arranged. The cooking utensil housing unit in particular defines the food chamber. The interior housing part advantageously at least substantially delimits the food chamber. The exterior housing part advantageously defines an exterior appearance of the cooking utensil housing unit and in particular of the cooking utensil, in particular as visible to an operator in an operating state. The exterior housing part and the interior housing part are connected in particular mechanically to one another and delimit in particular at least one intermediate space in at least one assembled state. In at least one operating state the functional unit is enclosed in particular at least partially by the cooking utensil housing unit. In particular the functional unit is arranged at least partially between the exterior housing part and the interior housing part, in particular in the intermediate space, in at least one operating state. In at least one operating state the receiving unit is at least partially integrated in particular in the cooking utensil, advantageously in the cooking utensil housing unit. The expression that the functional unit is "at least partially" integrated in the cooking utensil housing unit means in particular that a first part of the functional unit is arranged in the cooking utensil housing unit, in particular in the intermediate space of the cooking utensil housing unit, it being possible for a second part of the functional unit to be arranged outside the cooking utensil housing unit, for example in the food chamber. The drive unit and/or the receiving unit and/or the heating element and/or the sensor is/are advantageously arranged within the cooking utensil housing unit, in particular in the intermediate space, in at least one operating state. The food chamber is arranged in particular outside the intermediate space and advantageously in the food chamber. This allows in particular a protected arrangement of the receiving unit to be achieved. In particular a high level of stability can be attained.

It is further proposed that the exterior housing part and the interior housing part are made of materials with different magnetic properties. In particular the interior housing part is made at least largely of a metal, in particular a magnetic metal, advantageously a ferromagnetic metal. The interior housing part could be made for example at least largely of iron and/or ferromagnetic steel. In particular the exterior housing part is made at least largely of a non-metal. The exterior housing part could be made for example at least largely of plastic and/or ceramic. This in particular restricts heating to regions provided for the purpose and advantageously allows a transfer of energy at least substantially at the same time in further regions provided for the purpose. In particular this allows a high level of flexibility to be achieved in respect of configuration options.

It is further proposed that the exterior housing part and the interior housing part define at least one intermediate space, which is at least largely filled with an insulating material. The cooking utensil housing unit in particular has at least the insulating material, which is arranged between the exterior housing part and the interior housing part in at least one assembled state. In particular the insulating material is made at least largely of a material with a low thermal conductivity. The insulating material could be made for example at least largely of plastic and/or mineral wool and/or Teflon. This in particular allows a high level of efficiency to be achieved. In particular structural units arranged in the intermediate space can be supported in a protected manner.

In a further configuration a cooking system with at least one inventive cooking utensil and with at least one cooktop apparatus, in particular an induction cooktop apparatus, is proposed, having at least one induction unit, which is provided at least to supply energy for the receiving unit of the cooking utensil. A "cooktop apparatus" refers particular to at least a part, in particular a subassembly, of a cooktop, in particular of an induction cooktop. In particular the cooktop apparatus can also comprise the entire cooktop, in particular the entire induction cooktop. An "induction unit" refers in particular to a unit which is provided to supply at least one electromagnetic alternating field for an energy transfer in at least one operating state. The induction unit is provided in particular to generate and/or produce at least one induction current in the receiving unit of the cooking utensil by means of the electromagnetic alternating field in at least one operating state. The cooktop apparatus comprises in particular at least one cooktop operating unit, which is provided at least for the inputting of at least one processing parameter, in particular a rotation speed and/or a processing start time and/or a processing end time and/or a processing period, of the food processing unit. The cooktop operating unit is provided particular to supply and/or display to an operator at least two, in particular at least three, advantageously at least four and preferably at least five processing parameters for selection. In particular the cooktop apparatus comprises at least one cooktop control unit, which is provided to activate at least the control unit and/or drive unit. In particular the cooktop control unit is provided to control and/or regulate the processing parameter of the food processing unit, in particular by activating the control unit and/or drive unit. The cooktop control unit is provided in particular to activate the control unit and/or drive unit as a function of an operating input by means of a cooktop operating unit. The induction unit could for example have at least one energy transfer element that is configured differently from an induction heating element and could be provided in particular to supply the energy for the receiving unit in at least one operating state. In particular the energy transfer element could have at least one inductor and/or at least one coil. The energy transfer element could be provided in particular to supply the energy for the receiving unit at least by means of an inductive energy transfer in at least one operating state. The induction unit advantageously has at least one induction heating element, which is provided in particular to supply the energy for the receiving unit in at least one operating state. In particular the induction heating element is provide to heat at least a part of the cooking utensil, in particular a part of the interior housing part of the cooking utensil, in addition to supplying energy for the receiving unit, in at least one operating state. This in particular allows a high level of convenience to be achieved.

The cooking utensil and the cooking system here should not be restricted to the application and embodiment described above. In particular the cooking utensil and cooking system can have a number of individual elements, components and units that is different from the number cited herein to satisfy a mode of operation described herein.

Further advantages will emerge from the description of the drawing which follows. The drawing shows exemplary embodiments of the invention. The drawing, description and claims contain numerous features in combination. The person skilled in the art will expediently also consider the features individually and combine them in useful further combinations.

DETAILED DESCRIPTION OF EXEMPLARY EMBODIMENTS OF THE PRESENT INVENTION

Figure 1:
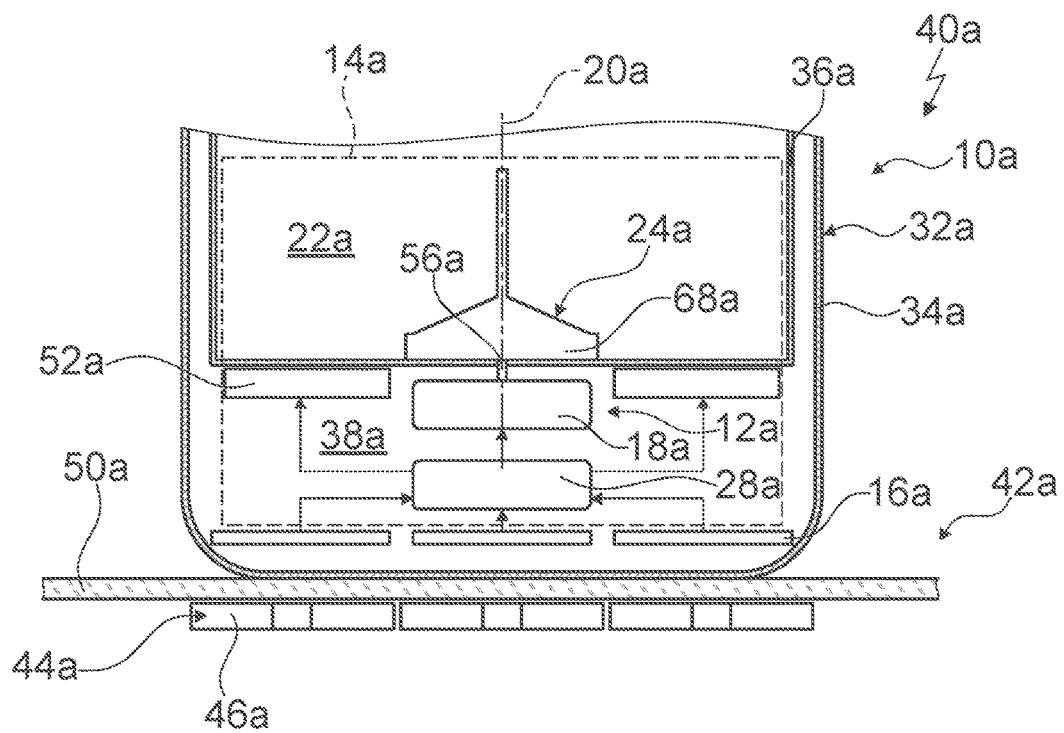
FIG. 1 shows a schematic sectional diagram of a cooking system with a cooking utensil and with a cooktop apparatus.

FIG. 1 shows a cooking system 40a, which is configured as an induction cooking system, with a cooking utensil 10a and with a cooktop apparatus 42a, which is configured as an induction cooktop apparatus. The cooktop apparatus 42a comprises a cooktop plate 50a. In an assembled state the cooktop plate 50a forms a part of a cooktop exterior housing. The cooktop plate 50a is provided to allow a cooking utensil 10a to be positioned thereon.

The cooking utensil 10a has a cooking utensil housing unit 32a. The cooking utensil housing unit 32a defines a food chamber 22a. The cooking utensil housing unit 32a of the cooking utensil 10a has an exterior housing part 34a facing away from the food chamber 22a. The cooking utensil housing unit 32a of the cooking utensil 10a has an interior housing part 36a facing the food chamber 22a.

The exterior housing part 34a and the interior housing part 36a are made of materials with different magnetic properties. The exterior housing part 34a is made largely of a non-metal. The interior housing part 36a is made largely of a ferromagnetic metal.

The exterior housing part 34a and the interior housing part 36a define an intermediate space 38a. The cooking utensil 10a has an insulating material (not shown). The intermediate space 38a is largely filled with the insulating material.

The cooking utensil 10a has a functional unit 14a. In an assembled state the functional unit 14a is arranged partially within the cooking utensil housing unit 32a. The functional unit 14a has a food processing unit 24a. In the assembled state the food processing unit 24a is arranged within the food chamber 22a. The food processing unit 24a has a processing tool 68a. The processing tool 68a is provided to process food arranged in the food chamber 22a. In the assembled state the processing tool 68a is arranged in the food chamber 22a. In the assembled state the food processing unit 24a is arranged in proximity to a base of the interior housing part 36a.

The functional unit 14a has a drive unit 12a. In an operating state the drive unit 12a drives the food processing unit 24a. In the assembled state the drive unit 12a is arranged within the cooking utensil housing unit 32a. The drive unit 12a is arranged in the intermediate space 38a in the assembled state. In the assembled state the drive unit 12a is arranged in proximity to the base of the interior housing part 36a. In the assembled state the drive unit 12a and the food processing unit 24a are separated from one another by the base of the interior housing part 36a.

In the assembled state a receiving unit 16a of the cooking utensil 10a is arranged in the intermediate space 38a in addition to the drive unit 12a. The cooking utensil 10a has the receiving unit 16a. The receiving unit 16a is provided to receive energy in a contactless manner. In the assembled state the receiving unit 16a is arranged in proximity to a base of the exterior housing part 34a.

The receiving unit 16a has an inductor. In the operating state the receiving unit 16a is provided to be magnetized by an electromagnetic alternating field. The receiving unit 16a is provided to receive energy transferred by means of inductive energy transfer. In the operating state the receiving unit 16a is provided to supply energy to the functional unit 14a.

In the operating state the drive unit 12a supplies a magnetic field to drive the food processing unit 24a. The drive unit 12a has an electric motor 18a. In the operating state the drive unit 12a supplies the magnetic field to drive the food processing unit 24a within the electric motor 18a. The electric motor 18a uses the magnetic field to generate a rotational movement about a rotation axis 20a. In the operating state the electric motor 18a drives the food processing unit 24a by means of the rotational movement.

The cooking utensil 10a has a shaft 56a. In the assembled state the shaft 56a connects the electric motor 18a and the food processing unit 24a to one another. In the operating state the shaft 56a transfers the rotational movement generated by the electric motor 18a to the food processing unit 24a.

In the assembled state the shaft 56a is arranged partially in the intermediate space 38a. The interior housing part 36a has a recess (not shown). In the assembled state the shaft 56a engages through the recess of the interior housing part 36a. A seal is arranged between the shaft 56a and a lateral delimitation of the recess, substantially preventing food arranged in the food chamber 22a passing into the intermediate space 38a.

The functional unit 14a has a control unit 28a. In the assembled state the control unit 28a is arranged within the cooking utensil housing unit 32a. In the assembled state the control unit 28a is arranged in the intermediate space 38a. In the operating state the control unit 28a is provided to activate the drive unit 12a. In the operating state the control unit 28a manages energy supplied by the receiving unit 16a for energy supply purposes. In the operating state the control unit 28a regulates an energy supply from the receiving unit 16a to the drive unit 12a.

Figure 2:
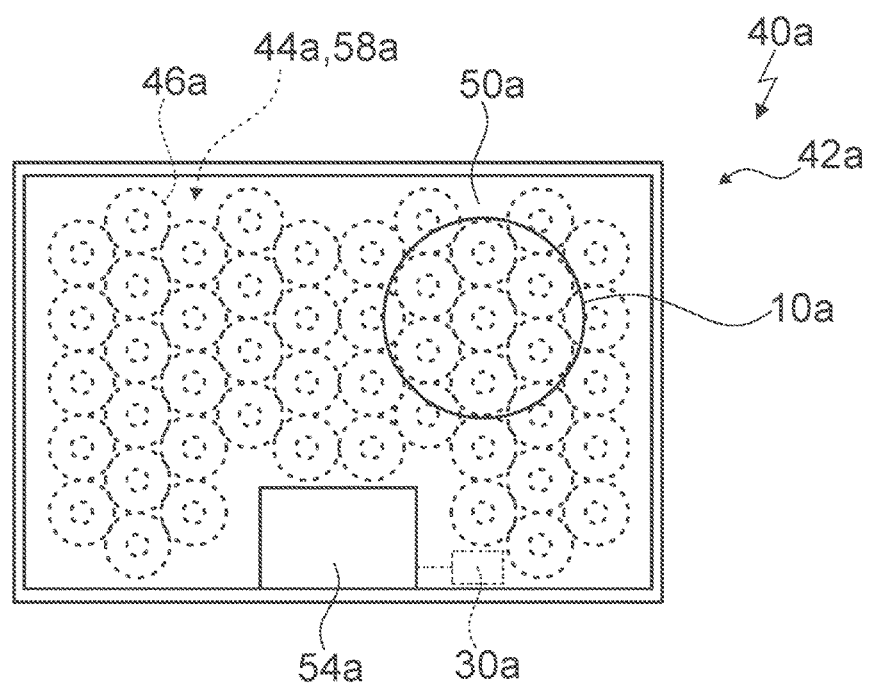
FIG. 2 shows a schematic plan view of the cooking system with the cooktop apparatus and with the cooking utensil.
Figure 3:
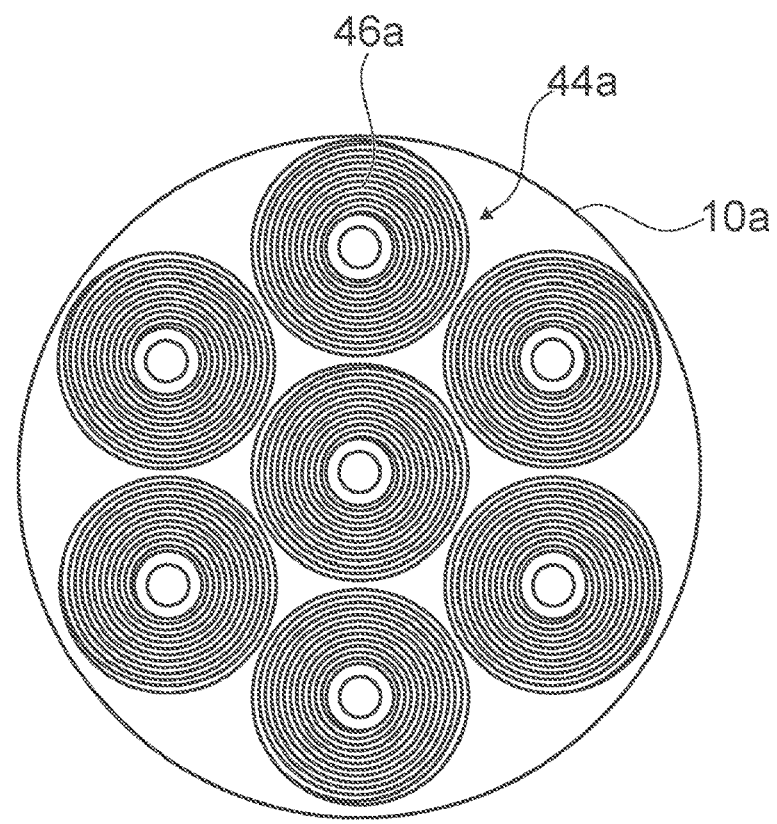
FIG. 3 shows an enlarged detail from FIG. 2.

The cooktop apparatus 42a has an induction unit 44a (see FIGS. 1 to 3). The induction unit 44a is provided to supply energy for the receiving unit 16a of the cooking utensil 10a. In the operating state the induction unit 44a supplies an electromagnetic alternating field to supply energy for the receiving unit 16a. The induction unit 44a supplies the receiving unit 16a with energy by means of inductive energy transfer.

In the present exemplary embodiment the induction unit 44a forms a variable cooking surface region 58a. The induction unit 44a has a number of induction heating elements 46a. Only one of a number of objects present multiple times is shown with a reference character in each of the figures. The induction heating elements 46a are arranged in the form of a matrix. Alternatively the induction heating elements could in particular form a conventional cooktop, which could have in particular fixed heating zones defined by the positions of the induction heating elements and which could in particular be marked on the cooktop plate.

In the present exemplary embodiment the induction unit 44a has forty eight induction heating elements 46a. Only one of the induction heating elements 46a is described in the following. The induction heating element 46a is provided to heat a cooking utensil 10a positioned on the cooktop plate 50a above the induction heating element 46a. In the operating state the induction heating element 46a supplies the energy for the receiving unit 16a.

The cooktop apparatus 42a has a cooktop operating unit 54a for inputting and/or selecting operating parameters, for example a heat output and/or a heat output density and/or a heating zone. The cooktop operating unit 54a is provided to output a value of an operating parameter to an operator.

The cooktop apparatus 42a has the cooktop control unit 30a. The cooktop control unit 30a is provided to execute actions and/or change settings as a function of operating parameters input by means of the cooktop operating unit 54a. The cooktop control unit 30a regulates an energy supply to the induction unit 44a for the performance of a heating operation. The cooking utensil 10a is provided to be positioned on the cooktop plate 50a for the performance of the heating operation.

The functional unit 14a has a heating element 52a. Alternatively the functional unit could have a number of heating elements. In the assembled state the heating element 52a is arranged within the cooking utensil housing unit 32a. In the assembled state the heating element 52a is arranged in the intermediate space 38a.

In the operating state the heating element 52a heats the interior housing part 36a. In the assembled state the heating element 52a is arranged in proximity to a base of the interior housing part 36a. In the operating state the heating element 52a is provided to heat items to be cooked. In the operating state the heating element 52a is provided to heat food arranged in the food chamber 22a.

In the operating state the cooktop control unit 30a sends operating information to the control unit 28a of the functional unit 14a. In the operating state the control unit 28a receives the operating information from the cooktop control unit 30a. In the operating state the control unit 28a communicates with the cooktop control unit 30a. In the operating state the control unit 28a regulates an energy supply from the receiving unit 16a to the drive unit 12a and/or to the heating element 52a as a function of the operating information received from the cooktop control unit 30a. The operating information could be for example information relating to the operating parameters input and/or selected by means of the cooktop operating unit.

In the present exemplary embodiment the food processing unit 24a is configured as a whisking unit. The food processing unit 24a is provided to mix food arranged within the food chamber 22a.

Figure 4:
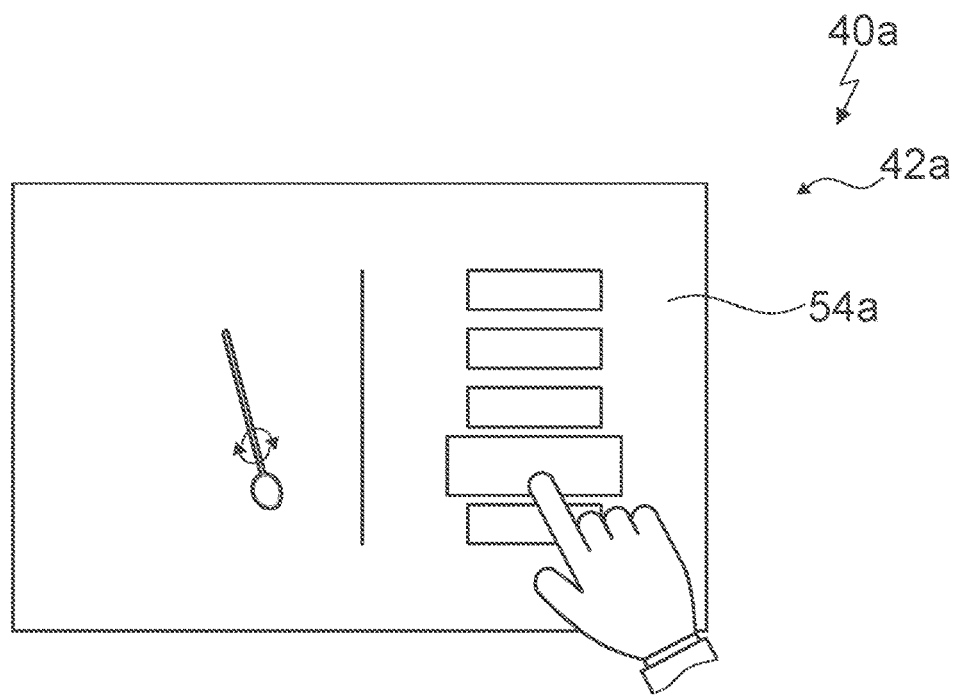
FIG. 4 shows a schematic plan view of a cooktop operating unit of the cooktop apparatus.

The cooktop operating unit 54a is provided for the inputting of a rotation speed of the food processing unit 24a (see FIG. 4). In the present exemplary embodiment the cooktop operating unit 54a has a touch-sensitive operating element for inputting the rotation speed of the food processing unit 24a. The cooktop operating unit 54a has a display unit. The cooktop operating unit 54a provides an operator with a selection of rotation speeds by means of the display unit. The display unit is provided to display a rotation speed selected by an operator in an enlarged manner.

The cooktop control unit could activate the drive unit to control the rotation speed of the food processing unit for example as a function of an operating input by means of the cooktop operating unit. Alternatively the cooktop control unit could in particular transmit at least one operating information item to the control unit, which could be provided in particular to activate the drive unit to control the rotation speed of the food processing unit as a function of the operating information.

Figure 5:
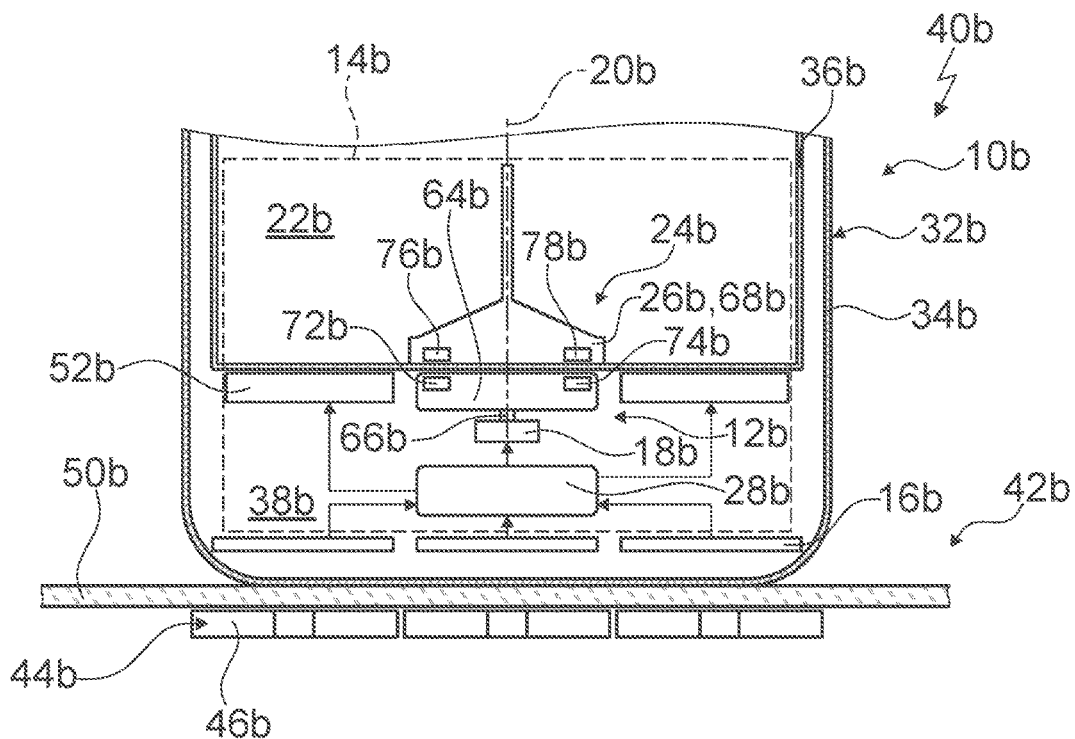
FIG. 5 shows a schematic sectional diagram of an alternative cooking system with a cooktop apparatus and with a cooking utensil and FIG. 6 shows a schematic sectional diagram of an alternative cooking system with a cooktop apparatus and with a cooking utensil.
Figure 6:
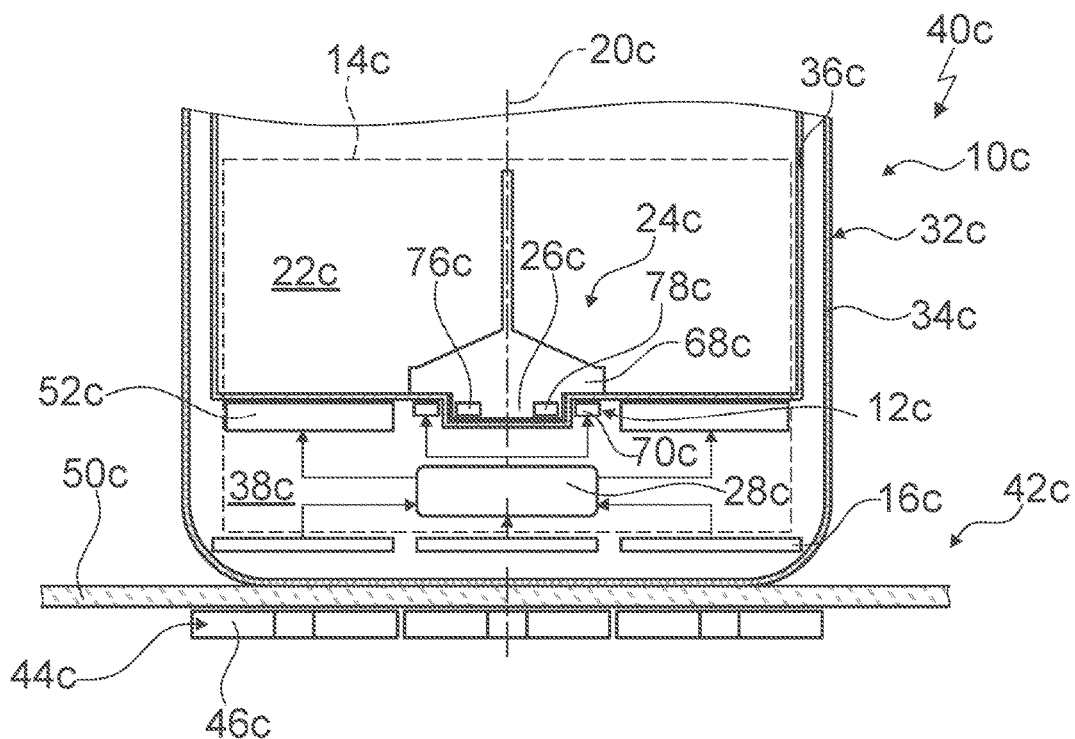

Further exemplary embodiments of the invention are shown in FIGS. 5 and 6. The descriptions which follow are substantially restricted to the differences between the exemplary embodiments, it being possible to refer to the description of the exemplary embodiments in FIGS. 1 to 4 for parts, features and functions that remain the same. To distinguish between the exemplary embodiments the letter a in the reference characters of the exemplary embodiments in FIGS. 1 to 4 is replaced by the letters b and c in the reference characters of the exemplary embodiments in FIGS. 5 and 6. Reference can also be made in principle to the drawings and/or description of the exemplary embodiments in FIGS. 1 to 4 for parts with the same designation, in particular for parts with the same reference characters.

FIG. 5 shows an alternative cooking system 40b with an alternative cooktop apparatus 42b. In an operating state a drive unit 12b of a functional unit 14b drives a food processing unit 24b of the functional unit 14b. In the operating state the drive unit 12b supplies a magnetic field to drive the food processing unit 24b. The drive unit 12b has an electric motor 18b. The electric motor 18b is provided to drive the food processing unit 24b.

In the present exemplary embodiment the drive unit 12b has a permanent magnet 64b. In the assembled state the permanent magnet 64b is supported in such a manner that it can rotate about a rotation axis 20b. The drive unit 12b has a transfer element 66b. In the assembled state the transfer element 66b connects the electric motor 18b and the permanent magnet 64b to one another. The transfer element 66b is configured as a shaft.

The electric motor 18b is provided to drive the permanent magnet 64b. In the operating state the transfer element 66b transfers a rotational movement supplied by the electric motor 18b to the permanent magnet 64b. In the operating state the permanent magnet 64b generates the magnetic field to drive the food processing unit 24b.

The drive unit 12b supplies a magnetic field that rotates substantially about a rotation axis 20b to drive the food processing unit 24b. In the operating state the magnetic field supplied by the drive unit 12b engages partially in a food chamber 22b of a cooking utensil 10b. The drive unit 12b supplies the magnetic field to drive the food processing unit 24b by means of the rotational movement of the permanent magnet 64b.

The food processing unit 24b has a magnetic element 26b. The magnetic element 26b is configured as a single piece with a processing tool 68b of a food processing unit 24b. In the operating state the magnetic element 26b interacts with the magnetic field supplied by the drive unit 12b.

The magnetic element 26b and the permanent magnet 64b are configured to correspond to one another. In the operating state the magnetic element 26b and the permanent magnet 64b interact with one another. The permanent magnet 64b has at least one first magnetic pole 72b and one at least second magnetic pole 74b. The magnetic element 26b has one at least first magnetic pole 76b and one at least second magnetic pole 78b. For example the permanent magnet and the magnetic element could have a number of first magnetic poles and a number of second magnetic poles, in particular in a first instance.

In a first instance the magnetic poles 72*b*, 74*b* of the permanent magnet 64*b* could in particular be configured substantially identically to one another. The magnetic poles 76*b*, 78*b* of the magnetic element 26*b* could in particular be configured substantially identically to one another. For example the magnetic poles 72*b*, 74*b* of the permanent magnet 64*b* could be arranged facing the cooktop plate 50*b* in the installed position. The magnetic poles 76*b*, 78*b* of the magnetic element 26*b* could for example be arranged facing the cooktop plate 50*b* in the installed position. For example the magnetic poles 72*b*, 74*b* of the permanent magnet 64*b* could be configured as south poles and the magnetic poles 76*b*, 78*b* of the magnetic element 26*b* as north poles. Alternatively the magnetic poles 72*b*, 74*b* of the permanent magnet 64*c* could be configured as north poles and the magnetic poles 76*b*, 78*b* of the magnetic element 26*b* as south poles.

In a second instance the magnetic poles 72*b*, 74*b* of the permanent magnet 64*b* could in particular be configured differently. The first magnetic pole 72*b* of the permanent magnet 64*b* could be configured as a north pole and the second magnetic pole 74*b* of the permanent magnet 64*b* could be configured as a south pole. The magnetic poles 76*b*, 78*b* of the magnetic element 26*b* could in particular be configured differently. The first magnetic pole 76*b* of the magnetic element 26*b* could be configured as a south pole and the second magnetic pole 78*b* of the magnetic element 26*b* could be configured as a north pole.

FIG. 6 shows an alternative cooking system 40*c*, with an alternative cooktop apparatus 42*c*. In an operating state a drive unit 12*c* of a functional unit 14*c* drives a food processing unit 24*c*. In the operating state the drive unit 12*c* supplies a magnetic field to drive the food processing unit 24*c*.

In an operating state the drive unit 12*c* supplies a magnetic field that rotates substantially about a rotation axis 20*c* to drive the food processing unit 24*c*. In the operating state the magnetic field supplied by the drive unit 12*c* engages partially in a food chamber 22*c* of a cooking utensil 10*c*.

In the present exemplary embodiment the drive unit 12*c* has at least two electromagnets 70*c*. The drive unit 12*c* has a number of electromagnets 70*c*. It is assumed in the following that the drive unit 12*c* has a number n of electromagnets 70*c*.

In an assembled state the electromagnets 70*c* are arranged around the rotation axis 20*c*. In the assembled state the electromagnets 70*c* are arranged in a regular manner and substantially in one plane around the rotation axis 20*c*. The electromagnets 70*c* are arranged around the rotation axis 20*c* at an angle of substantially 360°/n from the rotation axis 20*c* in the plane.

In an operating state a control unit 28*c* of the functional unit 14*c* is provided to activate the electromagnets 70*c* as a function of operating information transmitted by a cooktop control unit 30*c*. In the operating state the control unit 28*c* operates the electromagnets 70*c*. In the operating state the control unit 28*c* activates the electromagnets 70*c* by means of pulse width modulation. The control unit 28*c* activates the electromagnets 70*c* with signals with a phase offset of substantially 360°/n. The electromagnets 70*c* supply the magnetic field rotating substantially about the rotation axis 20*c* as a function of activation by the control unit 28*c* to drive the functional unit 14*c*.

The drive unit 12*c* is free of moving parts. In the operating state the drive unit 12*c* drives the magnetic element 26*c* of the food processing unit 24*c*. In the present exemplary embodiment the magnetic element 26*c* has a first magnetic pole 76*c* and a second magnetic pole 78*c*. The first magnetic pole 76*c* is configured as a south pole. The second magnetic pole 78*c* is configured as a north pole.

The invention claimed is:

1. A cooking utensil for positioning on a cooktop plate to perform a heating operation, comprising:
   a cooking utensil housing part which defines a food chamber;
   a functional unit comprising a food processor disposed in the food chamber, a drive unit having a least a portion disposed outside of the food chamber, with the drive unit being at least one of configured to supply at least one magnetic field to drive the food processor or being at least one electric motor configured to drive the food processor, and at least one heating element configured to heat an item to be cooked disposed in the food chamber; and
   a receiving unit configured to receive energy in a contactless manner and to supply energy to the drive unit and to the at least one heating element.

2. The cooking utensil of claim 1, wherein the functional unit includes at least one control unit.

3. The cooking utensil of claim 2, wherein the control unit is configured to manage energy supplied by the receiving unit to supply energy to the functional unit in at least one operating state.

4. The cooking utensil of claim 2, wherein the control unit is configured to communicate with at least one cooktop control unit in at least one operating state.

5. The cooking utensil of claim 1, wherein the receiving unit includes at least one inductor.

6. The cooking utensil of claim 1, wherein the drive unit is configured to supply the at least one magnetic field to drive the food processor.

7. The cooking utensil of claim 1, wherein the drive unit includes the at least one electric motor configured to drive the food processor.

8. The cooking utensil of claim 1, wherein the drive unit is configured to supply the at least one magnetic field to rotate at least substantially about at least one rotation axis and engage at least partially in the food chamber to drive the food processor.

9. The cooking utensil of claim 8, wherein the food processor includes at least one magnetic element configured to interact with the at least one magnetic field.

10. The cooking utensil of claim 1, wherein the cooking utensil housing part includes at least one exterior housing part which faces away from the food chamber, and at least one interior housing part which faces the food chamber, said functional unit being at least partially arranged within the cooking utensil housing part.

11. The cooking utensil of claim 10, wherein the exterior housing part is made of a material having a magnetic property, said interior housing part being made of a material which has a magnetic property which is different than the magnetic property of the material of the exterior housing part.

12. The cooking utensil of claim 10, wherein the exterior housing part and the interior housing part define at least one intermediate space, and further comprising an insulating material to at least largely fill the at least one intermediate space.

13. A cooking system, comprising:
   a cooking utensil including a cooking utensil housing part which defines a food chamber; a functional unit having a food processor disposed in the food chamber, a drive unit having a least a portion disposed outside of the food chamber, with the drive unit being at least one of configured to supply at least one magnetic field to drive the food processor or being at least one electric motor configured to drive the food processor, and at least one heating element configured to heat an item to be cooked disposed in the food chamber; and a receiving unit including at least one inductor which is configured to receive energy in a contactless manner and to supply energy to the drive unit and to the at least one heating element; and a cooktop apparatus including at least one induction unit configured to at least supply energy for the receiving unit of the cooking utensil.

14. The cooking system of claim 13, wherein the functional unit of the cooking utensil includes at least one control unit.

15. The cooking system of claim 14, wherein the control unit of the functional unit is configured to manage energy supplied by the receiving unit to supply energy to the functional unit in at least one operating state.

16. The cooking system of claim 14, wherein the cooktop apparatus includes a cooktop control unit, said control unit being configured to communicate with the cooktop control unit in at least one operating state.

17. The cooking system of 13, wherein the drive unit is configured to supply the at least one magnetic field to drive the food processor.

18. The cooking system of claim 13, wherein the drive unit includes the at least one electric motor configured to drive the food processor.

19. The cooking system of claim 13, wherein the drive unit is configured to supply the at least one magnetic field to rotate at least substantially about at least one rotation axis and engage at least partially in the food chamber to drive the food processor.

20. The cooking system of claim 19, wherein the food processor of the functional unit includes at least one magnetic element configured to interact with the at least one magnetic field.

21. The cooking system of claim 13, wherein the cooking utensil housing part includes at least one exterior housing part which faces away from the food chamber, and at least one interior housing part which faces the food chamber, said functional unit of the cooking utensil being at least partially arranged within the cooking utensil housing part.

22. The cooking system of claim 21, wherein the exterior housing part is made of a material having a magnetic property, said interior housing part being made of a material which has a magnetic property which is different than the magnetic property of the material of the exterior housing part.

23. The cooking system of claim 21, wherein the exterior housing part and the interior housing part define at least one intermediate space, said cooking utensil including an insulating material to at least largely fill the at least one intermediate space.

24. A cooking utensil for positioning on a cooktop plate to perform a heating operation, comprising:
a cooking utensil housing part which defines a food chamber;
a functional unit comprising a food processor disposed in the food chamber and a drive unit including at least one electric motor having a rotational shaft for transferring rotational movement generated by the electric motor to the food processor, with the electric motor being disposed outside of the food chamber and the rotational shaft passing through an opening in the cooking utensil housing part; and
a receiving unit including at least one inductor configured to receive energy in a contactless manner and to supply energy to the functional unit.

25. The cooking utensil of claim 24, wherein the functional unit includes at least one heating element configured to heat an item to be cooked.

26. The cooking utensil of claim 24, wherein a seal is arranged between the rotational shaft and the opening in the cooking utensil housing part.

* * * * *